United States Patent
Emmerling et al.

(10) Patent No.: US 7,196,432 B2
(45) Date of Patent: Mar. 27, 2007

(54) DEVICE AND METHOD FOR PROTECTING A MOTOR VEHICLE AGAINST THEFT

(75) Inventors: Ulrich Emmerling, Kelheim (DE); Axel Müller, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 357 days.

(21) Appl. No.: 10/848,810

(22) Filed: May 19, 2004

(65) Prior Publication Data

US 2004/0239186 A1 Dec. 2, 2004

(30) Foreign Application Priority Data

May 23, 2003 (DE) .................. 103 23 504

(51) Int. Cl.
B60R 25/00 (2006.01)
B60R 25/04 (2006.01)
H04B 3/54 (2006.01)
G08B 25/06 (2006.01)

(52) U.S. Cl. ............ 307/10.3; 307/10.1; 307/10.2; 307/10.4; 307/10.6; 340/428

(58) Field of Classification Search ......... 307/10.2, 307/10.3, 10.4, 10.6, 10.1; 340/428
See application file for complete search history.

(56) References Cited

U.S. PATENT DOCUMENTS 4,672,225 A * 6/1987 Hanisko et al. ............ 307/10.5
4,804,856 A * 2/1989 Hanisko et al. ............ 307/10.2
5,083,362 A 1/1992 Edgar et al. ................ 29/509
5,455,571 A * 10/1995 Janssen ..................... 340/5.31
5,612,578 A * 3/1997 Drew ........................ 307/10.5
6,958,551 B2 * 10/2005 Janssen ..................... 307/10.3

FOREIGN PATENT DOCUMENTS

| DE | 2929772 | 7/1979 |
| DE | 4201783 A1 | 1/1992 |
| DE | 4330733 | 9/1992 |
| DE | 43 30 733 A1 | 12/1994 |
| DE | 43 30 733 C2 | 2/1996 |

* cited by examiner

Primary Examiner—Anatoly Vortman
Assistant Examiner—Michael Rutand-Wallis
(74) Attorney, Agent, or Firm—Baker Botts L.L.P.

(57) ABSTRACT

In the device a controllable switch is built into the control device which enables the start authorization and by means of which the supply voltage with which this controllable switch is supplied can be switched off. To check a start authorization a diagnosis can be undertaken which is realized with known resistance elements in the voltage supply line between identification device holder and control device. This allows the voltage drops across the elements to be compared with the corresponding required values. Simple short circuiting of the starter or the ignition is thus no longer possible since this would be detected by the control device as a result of the changes in voltage drop. In addition a fault in the supply voltage or the feed lines can be definitively detected.

20 Claims, 3 Drawing Sheets

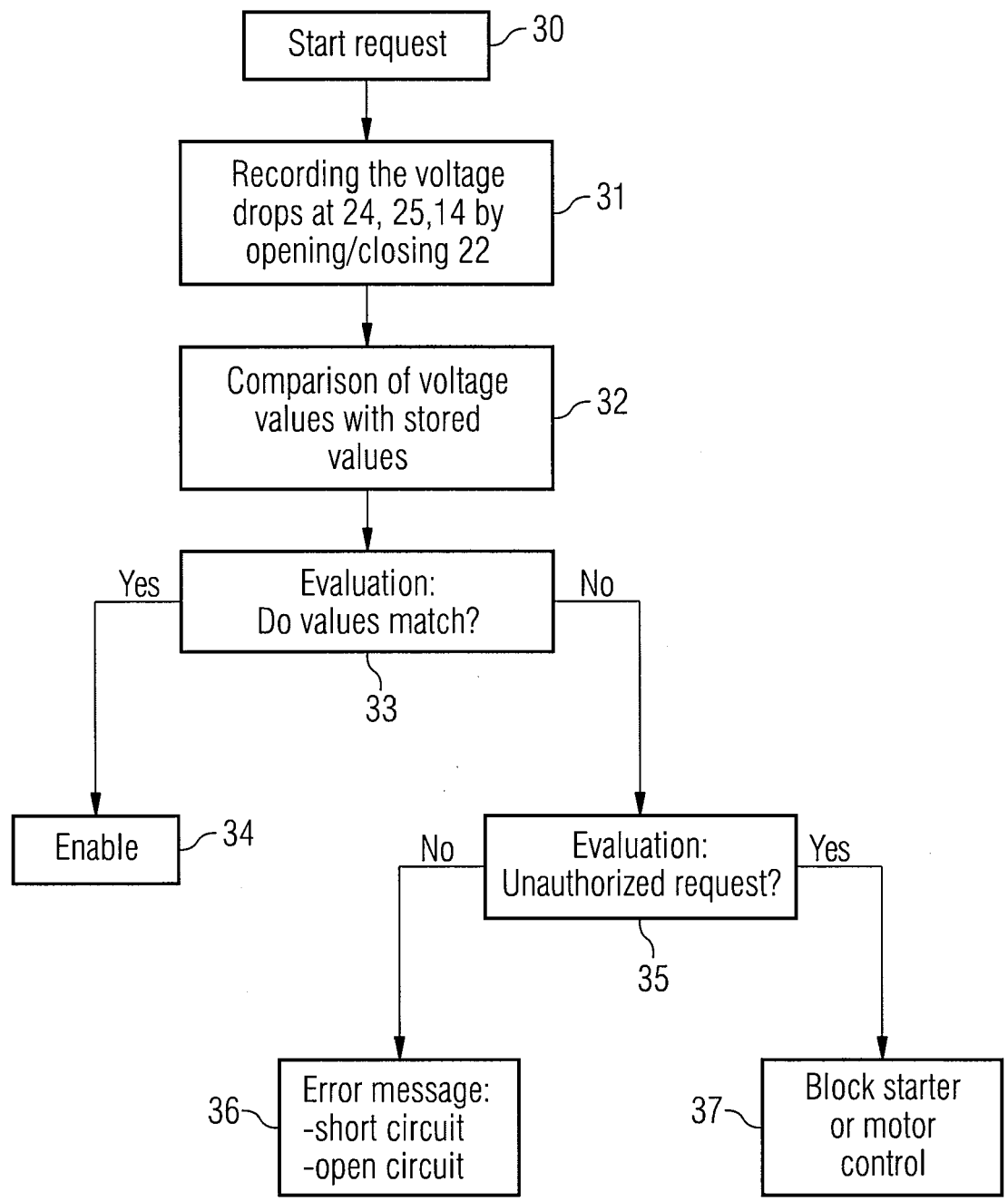

DEVICE AND METHOD FOR PROTECTING A MOTOR VEHICLE AGAINST THEFT

PRIORITY

This application claims priority to German application no. 103 23 504.3 filed May 23, 2003.

TECHNICAL FIELD OF THE INVENTION

The present invention relates to a device and method for protecting a motor vehicle against theft.

BACKGROUND OF THE INVENTION

With motor vehicles the internal combustion engine is started using a battery-fed electrical machine known as the starter, with the electrical circuit of the starter able to be completed by an ignition switch operated by an ignition key. The ignition lock is connected to the plus pole of the battery, with the circuit being routed onwards from the ignition lock to the solenoid of the starter and from there to the minus pole of the battery. In a normal operating mode the circuit can only be completed when the ignition key suitable for the relevant ignition lock is available. With an intended theft of the motor vehicle, breaking into the vehicle is in many cases followed by short circuiting the starter switch (or the ignition lock) so that the starter can then be operated. To prevent this from being done many anti-theft systems are offered which are designed to prevent unauthorized starting of the motor vehicle. Such anti-theft systems are also referred to as immobilizers.

With a very simple embodiment of such an immobilizer an interrupting switch arranged in the circuit is used, located at a position in the vehicle known only to the driver. The disadvantages such a device lie in the fact that on the one hand in many cases the driver often forgets to activate the switch and on the other hand that a potential thief very frequently knows where such interrupting switches are installed. In both cases this means that this form of anti-theft device is ineffective.

In German Patent DE 43 30 733 C1 a further simple anti-theft device in a motor vehicle is described via which the motor vehicle can be put into a drivable state using resistive encoding. Resistive including in this case consists of resistors which are arranged in load lines at the ignition lock in a mechanically defined sequence. The evaluation of the drop in voltage at the resistance encodings allows any unintentional short-circuiting of the motor vehicle to be identified. A disadvantage of the arrangement described in DE 43 30 733 C1 is that it only allows the situation to be detected of whether the voltage drop measured at the relevant resistors deviates from the expected voltage drop. With the arrangement described in DE 43 30 733 A1 it is not however possible to establish whether the incident involved was actually an attempt at unauthorized short-circuiting (theft) or a fault in the lines or in the power supply, for example with a short circuit or open circuit. A diagnosis of this fault source compared to a theft is thus not possible.

Modern anti-theft devices in motor vehicles use electronic immobilizers, for example with transponders. With such electronic immobilizers there is data communication between a transceiver arranged in the motor vehicle and a transponder arranged for example in a key or a key fob of the vehicle user. Before the motor vehicle is put into use there is first an exchange of encoded data which ensures that the vehicle use is authorized, by the vehicle owner for example.

Such electronic anti-theft systems are however expensive and thus cost-intensive. Despite this such anti-theft systems are required in many countries for insurance reasons. In other countries in which these insurance conditions to not exist motor vehicles are frequently not fitted with such electronic anti-theft systems. There manipulation of the first switch and/or resistance network.

SUMMARY OF THE INVENTION

The object of the present invention is to specify a simple anti-theft device for a motor vehicle, in particular by means of which misuse can be distinguished from a fault in the system.

In accordance with the invention this object can be achieved by a device for protecting a motor vehicle against theft, comprising an Identification device holder which is connected via a first line to an energy supply and comprises a first switch, a resistance network arranged in the first line of which the elements comprise a defined resistance encoding, a second, controllable switch which is arranged to switch on the energy supply arranged between the energy supply and the resistance network, and a control unit arranged in a motor vehicle, which comprises a diagnosis and evaluation unit which is connected to at least one tap of the resistance network and which, depending on the switch position of the second switch, evaluates the voltage drops over the elements of the resistance network and, depending on this, makes a distinction between a correct Access authorization, a fault in the energy supply or the first line, and an external manipulation of the identification device holder.

The object can also be achieved by an anti-theft device for protecting a motor vehicle, comprising a resistance network arranged comprising elements with a defined resistance encoding and a first switch, a second, controllable switch which is arranged to couple an energy supply with the resistance network, and a control unit arranged in a motor vehicle, which comprises a diagnosis and evaluation unit which is connected to at least one tap of the resistance network and which, depending on the switch position of the second switch, evaluates the voltage drops over the elements of the resistance network and, depending on this, makes a distinction between a correct Access authorization, a fault in the energy supply or the coupling, and an external manipulation of the first switch and/or resistance network.

The second switch can be arranged in the control unit. The resistance network can be embodied as a voltage divider. The resistance network may comprise at least one first resistor, which is arranged in the identification device holder, and at least a second resistor which is arranged in the control unit. The resistance encoding of the elements of the resistance network can be adjustable. The diagnosis and evaluation circuit may comprise a programmable unit, especially a microcontroller or a microprocessor. The diagnosis and evaluation circuit and/or the control device may comprise a memory unit in which the required voltage values assigned to the relevant resistance encoding are stored. The control device may comprise a control unit for control of the motor vehicle's starter and/or is connected with a control of the starter and/or the motor control of the motor vehicle. The first and/or the second switch can be embodied as a high-side switch.

The object may further be achieved by a method for checking access authorization to a motor vehicle by means of an Identification device holder which is connected via a first line to an energy supply and comprises a first switch, a resistance network arranged in the first line of which the elements comprise a defined resistance encoding, and a second, controllable switch which is arranged to switch on the energy supply arranged between the energy supply and the resistance network, the method, in the event of a request for putting the motor vehicle into operation, comprises the steps of:

(a) Recording the voltage drops across elements of the resistance network for a closed and an open second switch, respectively;

(b) Comparing the recorded voltage drops with stored voltage values which correspond to relevant resistance encoding of the elements of the resistance network;

(c) Outputting an enable signal for starting the motor vehicle if the comparison reveals that the stored voltage values correspond to the relevant recorded voltage values.

The method may further comprise the step of outputting a signal to the motor control and/or the starter control and/or the ignition control that putting the motor vehicle into operation will be blocked if the comparison reveals that the stored voltage values do not match the corresponding recorded voltage values and it is concluded from the recorded voltage values that there has been unauthorized short circuiting of the ignition or the starter. The method may further comprise outputting an error signal to the vehicle user if the comparison reveals that the stored voltage values do not match the corresponding recorded voltage values and it is concluded from the recorded voltage values that there is a fault in the energy supply.

The underlying idea of the present invention consists of equipping motor vehicles which do not feature an expensive electronic immobilizer system with a very simple circuit but nonetheless very effective anti-theft capability. To do this the invention uses the knowledge that only the switch which enables start authorization is activated via a control device, so that the supply voltage with which this controllable switch is supplied can be switched off. This controllable switch for start authorization is advantageously implemented directly in the control device as well.

The present invention is also based on the knowledge that checking a start authorization requires a diagnosis which is realized using a resistance encoding in the line between identification device holder and control device. This resistance encoding takes the form of a network of resistors with resistance elements known for the control device. Thus the voltage drops across the elements of the resistance network can be compared with the corresponding required values so that the lines can thus be diagnosed via the resistance encoding. Simple short circuiting or other manipulation of the starter or of the ignition is thus no longer possible since this would immediately be detected by the control device as a result of the changes in voltage drop caused at the elements of the resistance network.

With the device in accordance with the invention it is thus possible to offer a greater level of anti-theft protection than with systems without immobilizers. The device in accordance with the invention also stands out because of its very low costs since it can be implemented using a very simple hardware components such as resistors and controllable switches.

Advantageously the resistance network is embodied as a simple voltage divider. Instead of a voltage divider a resistance network consisting of a plurality of permanently connected or also variably connectable resistors can be provided. In addition or as an alternative it would be conceivable for the resistors to be adjustable.

Advantageously at least one resistor of the resistance network in each case is implemented in the identification device holder and another in the control device itself. In this way a manipulation is made very much more difficult since the anti-theft device can only be bypassed by the difficult process of the intervening in the control device or in the identification device holder.

In an advantageous embodiment the resistance encoding of the elements of the resistance network is adjustable. A modification of the individual resistance values can for example be undertaken during a start request, during a visit to the workshop or controlled via the control device at random intervals. This gives even better protection against misuse.

The diagnosis and evaluation circuit is typically implemented in a programmable unit, for example in microcontroller or microprocessor. This typically also features a memory device in which the corresponding required values for the voltage drops over the resistors of the resistance network are stored.

The controllable switch is embodied in one design as a high-side switch. In particular the controllable switch can be embodied as a switch is activated by the control device or its microcontroller.

Advantageous embodiments and developments can be taken from the subclaims as well as the description while referring to the drawing.

BRIEF DESCRIPTION OF THE DRAWINGS

The invention is described in more detail below on the basis of the exemplary embodiments specified in the schematic figures of the drawing. The drawing shows:

FIG. 3 shows the mode of operation of the device shown in FIG. 2 in the form of a flowchart.

DETAILED DESCRIPTION OF THE PREFERRED EMBODIMENTS

Figure 1:
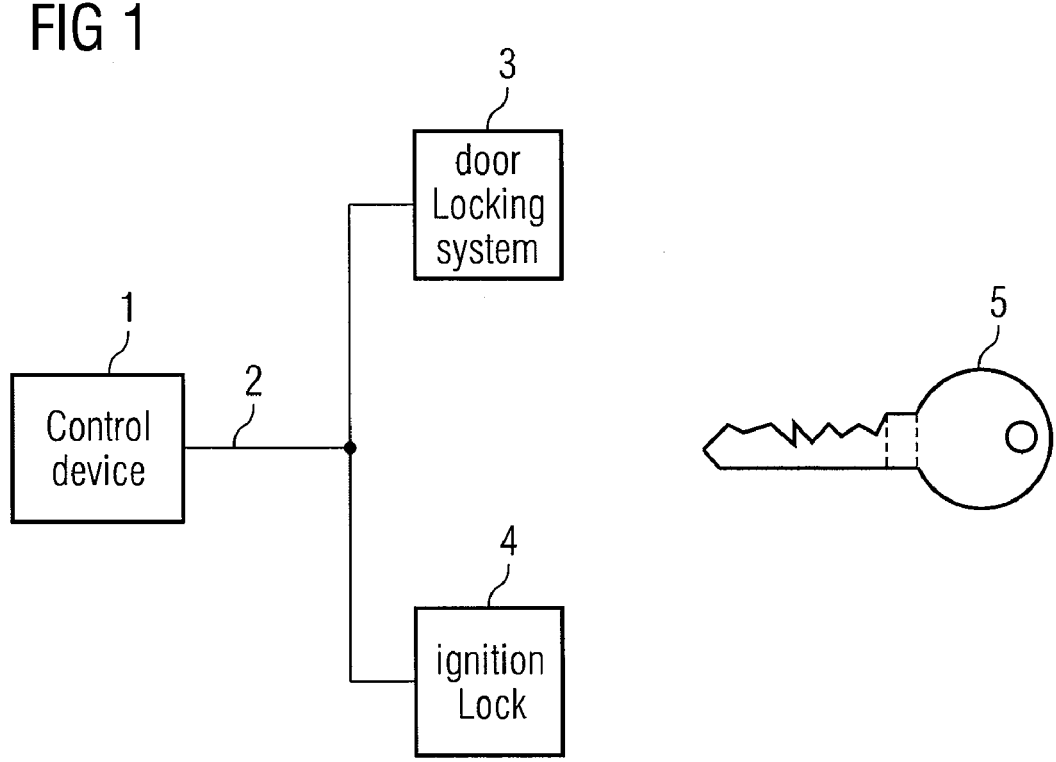
FIG. 1 a general block diagram for an electrical locking system in a motor vehicle.

In the figures of the drawing identical elements or elements with the same functions have been labeled with the same reference numbers.

FIG. 1 shows in a general form a block diagram for an electrical locking system in a motor vehicle which features a control device 1 in the motor vehicle (not shown). The control device 1 uses lines 2 which can be operated bidirectionally for a connection to communicate with the vehicle door locking system 3, especially a central locking system and/or the vehicle ignition lock 4. The door locking system 3 and/or the ignition lock 4 can be activated by a key 5 carried by a user of the vehicle which can be mechanically introduced into one of the locks 3, 4 for activation. In addition an electrical activation of the lock, e.g. by means of a remote-control for opening the doors, is conceivable. Key 5 can be embodied in a conventional way, i.e. using the known key—lock principle, or also as a credit card or chip card. Control device 1 can be formed by an immobilizer control unit or a driver authorization system control unit and includes all functions for opening and locking the vehicle doors. Control device 1 checks whether a key 5 being used is authorized or not, and for an authorized key 5 enables the corresponding control function.

Figure 2:
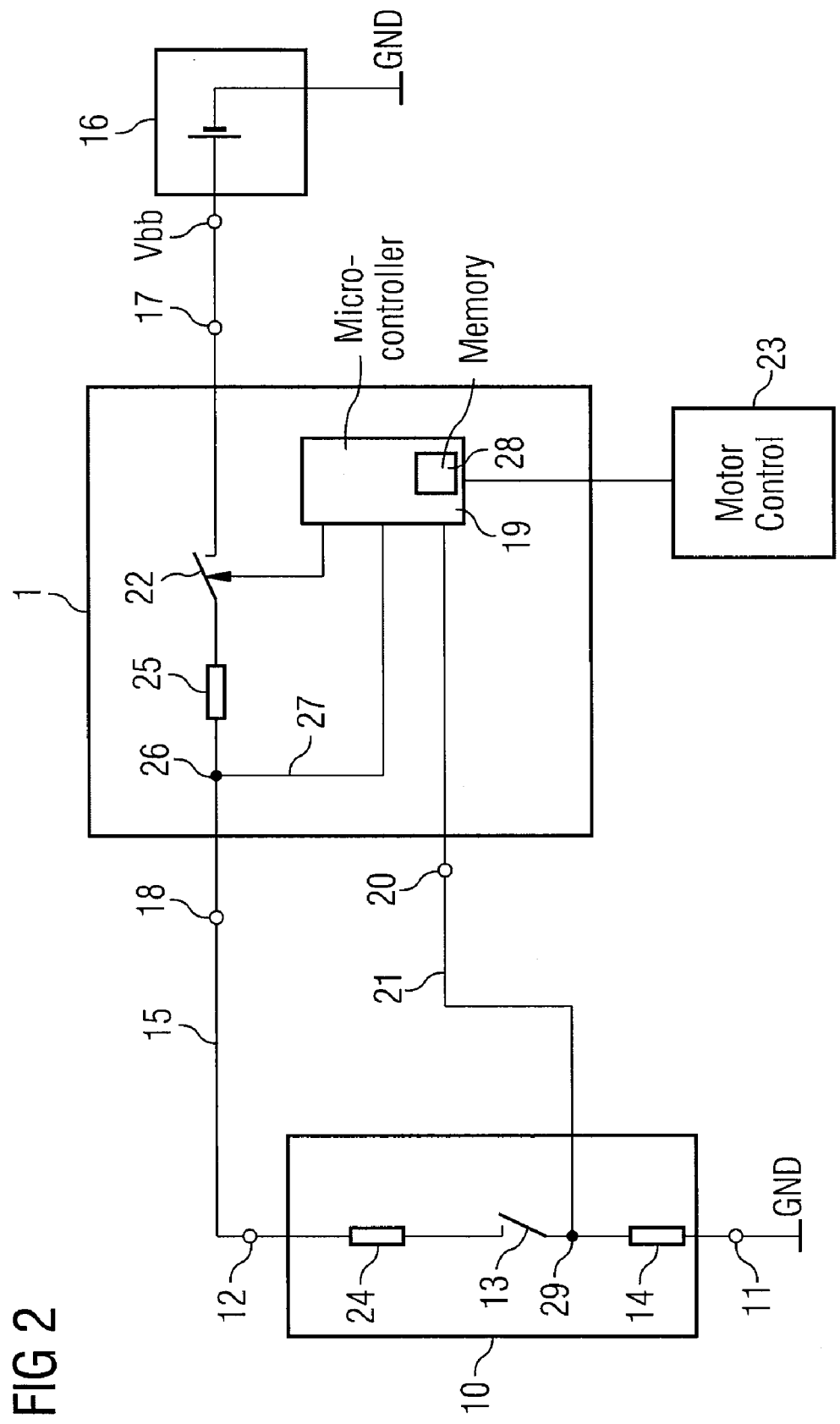
FIG. 2 a block diagram for an anti-theft device in accordance with the invention.

FIG. 2 shows a block diagram of the device in accordance with the invention for protecting a motor vehicle against theft.

The device in accordance with the invention features an identification device holder 10. The Identification device holder 10 features two supply connections 11, 12 via which the Identification device holder 10 can be supplied with energy. The Identification device holder 10 features a switch 13 which is connected in series with its load path with a load resistor 14 between connections 11, 12. In the present exemplary embodiment there is a first potential GND at the supply terminal 11, for example the reference ground potential GND. The supply output 12 of the Identification device holder 10 is connected via a supply lead 15 to an energy supply 16, for example a battery. Via the second supply terminal 12 and the energy supply 16 a second supply potential Vbb, for example the battery potential Vbb, can be applied to the identification device holder 10. The load resistor 14 is arranged here between the switch 13 and the supply terminal 11. The switch 13 is thus embodied as a high-side switch.

The device in accordance with the invention further contains a control device 1 which is arrange via terminals 17, 18 in the connecting line 15 and is thus arranged between the Identification device holder 10 and the energy supply 16. The control device 1 features a microcontroller 19. The microcontroller 19 is coupled via further terminal 20 and a connecting line 21 to a tap between the switch 13 and the resistor 14.

The control device 1 further features a controllable switch 22 which is arranged between the terminals 17, 18 in the connecting line 15. The controllable switch 22, which can for example be embodied as a MOSFET, is controlled by the microcontroller 19.

FIG. 2 further shows a motor control 23 which is connected via a connecting line to the microcontroller 19 of the control unit 1.

The device in accordance with the invention further features resistance encoding 24, 25 of the connecting line 15. The resistance encoding 24, 25 is embodied in the example in FIG. 2 in the form of a voltage divider with the resistors 24, 25. The first voltage divider resistor 24 is provided within the Identification device holder 10 and is arranged there between the supply terminal of the switch 13 and the terminal 12. The second voltage divider resistor 25 is provided within control unit 1 and is located there between the load terminal of the controllable switch 22 and the terminal 18. The middle tap 26 of the voltage divider 24, 25 is also arranged within the control device 1 and connected via a connecting lead 27 to the microcontroller 19.

FIG. 3 shows the mode of operation of the device in accordance with the invention shown in FIG. 2 in the form of a flowchart.

In the event of a start request (step 30) a check should be made as to whether this is a permitted, i.e. authorized start request by an authorized vehicle user or whether unauthorized starting of the motor vehicle by short-circuiting of the starter or the ignition by a thief is taking place. In the case all a start request (step 30) the relevant voltage drops at the resistors 14, 24, 25 are recorded (step 31). This is undertaken in each case in the closed and open position of the controllable switch 22. The opening and closing of the switch 22 is controlled via the microcontroller 19. The resistors 14, 24, 25 feature a known resistance encoding, which means that they feature a resistance value typically known only to microcontroller 19. Depending on these resistance values and depending on the relevant position of switch 22, there is a different voltage drop at each of the resistors 14, 24, 25. As the result of the different switch settings and resistance values a total of eight different voltage values are produced which can be recorded by the microcontroller 19 via the taps 26, 29. These voltage values are recorded via an analog/digital converter (not shown in FIG. 2) in microcontroller 19 (step 31). The voltage values recorded in each case are compared to prespecified voltage values (step 32). These comparison voltage values are stored in a memory device 28, for example a RAM or a ROM. These comparison voltage values correspond to the voltage drops via the relevant resistors 14, 24, 25 in the case of an authorized start request.

The result of the comparison of recorded voltage values and voltage comparison values is evaluated (step 33). From the comparison (step 33) an authorized start request, a fault or an intended theft can be deduced. In this case a threshold value is typically included which allows a tolerance, so that a slight voltage difference, which is for example always present in the case of an authorized start request, is also taken into account. If, taking into consideration this threshold, the voltage values match, it is concluded that there has been an authorized start request and a enabling signal (step 34) is forwarded to the engine control or the starter so the motor vehicle can be put into operation.

If the voltage values do not match, this does however not necessarily have to be attributable to an unauthorized start request (step 35). It is for example far more likely to be caused by a fault in the supply voltage. The voltage values recorded and evaluated thus also allow it to be establish whether the fault involved is such a fault (step 36), for example short circuit or open circuit supply voltage, or whether an unauthorized start request is actually involved (step 37). In the first cases (step 36) an error message in the form of a visual or audible signal is output for example, with the two fault cases—short circuit or supply voltage open circuit—additionally being able to be distinguished. In the case of an unauthorized start request (step 37) a corresponding notification is sent to the engine control and/or the starter so as to prevent the vehicle being put into operation.

We claim:

1. A device for protecting a motor vehicle against theft, comprising:
   an Identification device holder which is connected via a first line to an energy supply and comprises a first switch,
   a resistance network arranged in the first line of which the elements comprise a defined resistance encoding,
   a second, controllable switch which is arranged to switch on the energy supply arranged between the energy supply and the resistance network, and
   a control unit arranged in a motor vehicle, which comprises a diagnosis and evaluation unit which is connected to at least one tap of the resistance network and which, depending on the switch position of the second switch, evaluates the voltage drops over the elements of the resistance network and, depending on this, makes a distinction between a correct Access authorization, a fault in the energy supply or the first line, and an external manipulation of the identification device holder.

2. The device in accordance with claim 1, wherein the second switch is arranged in the control unit.

3. The device in accordance with claim 1, wherein resistance network is embodied as a voltage divider.

4. The device in accordance with claim 1, wherein the resistance network comprises at least one first resistor, which is arranged in the identification device holder, and at least a second resistor which is arranged in the control unit.

5. The device in accordance with claim 1, wherein the resistance encoding of the elements of the resistance network is adjustable.

6. The device in accordance with claim 1, wherein the diagnosis and evaluation circuit comprises a programmable unit, especially a microcontroller or a microprocessor.

7. The device in accordance with claim 1, wherein the diagnosis and evaluation circuit and/or the control device comprises a memory unit in which the required voltage values assigned to the relevant resistance encoding are stored.

8. The device in accordance with claim 1, wherein the control device comprises a control unit for control of the motor vehicle's starter and/or is connected with a control of the starter and/or the motor control of the motor vehicle.

9. The device in accordance with claim 1, wherein the first and/or the second switch is/are embodied as a high-side switch.

10. A method for checking access authorization to a motor vehicle by means of an Identification device holder which is connected via a first line to an energy supply and comprises a first switch, a resistance network arranged in the first line of which the elements comprise a defined resistance encoding, and a second, controllable switch which is arranged to switch on the energy supply arranged between the energy supply and the resistance network, the method, in the event of a request for putting the motor vehicle into operation, comprises the steps of:
    (a) Recording the voltage drops across elements of the resistance network for a closed and an open second switch, respectively;
    (b) Comparing the recorded voltage drops with stored voltage values which correspond to relevant resistance encoding of the elements of the resistance network;
    (c) depending on the comparison in Step (b) determining a correct access authorization, a fault in the energy supply or the first line, or an external manipulation of the identification device holder;
    (d) Outputting an enable signal for starting the motor vehicle if the comparison reveals that the stored voltage values correspond to the relevant recorded voltage values.

11. The method in accordance with claim 10, comprising the step of:
    (e) Outputting a signal to the motor control and/or the starter control and/or the ignition control that putting the motor vehicle into operation will be blocked if the comparison reveals that the stored voltage values do not match the corresponding recorded voltage values and it is concluded from the recorded voltage values that there has been unauthorized short circuiting of the ignition or the starter.

12. The method in accordance with claim 10, comprising the step of:
    (f) Outputting an error signal to the vehicle user if the comparison reveals that the stored voltage values do not match the corresponding recorded voltage values and it is concluded from the recorded voltage values that there is a fault in the energy supply.

13. An anti-theft device for protecting a motor vehicle, comprising:
    a resistance network arranged comprising elements with a defined resistance encoding and a first switch,
    a second, controllable switch which is arranged to couple an energy supply with the resistance network, and
    a control unit arranged in a motor vehicle, which comprises a diagnosis and evaluation unit which is connected to at least one tap of the resistance network and which, depending on the switch position of the second switch, evaluates the voltage drops over the elements of the resistance network and, depending on this, makes a distinction between a correct Access authorization, a fault in the energy supply or the coupling, and an external manipulation of the first switch and/or resistance network.

14. The device in accordance with claim 13, wherein the second switch is arranged in the control unit.

15. The device in accordance with claim 13, wherein the resistance network is embodied as a voltage divider.

16. The device in accordance with claim 13, wherein the resistance encoding of the elements of the resistance network is adjustable.

17. The device in accordance with claim 13, wherein the diagnosis and evaluation circuit comprises a programmable unit, especially a microcontroller or a microprocessor.

18. The device in accordance with claim 13, wherein the diagnosis and evaluation circuit and/or the control device comprises a memory unit in which the required voltage values assigned to the relevant resistance encoding are stored.

19. The device in accordance with claim 13, wherein the control device comprises a control unit for control of the motor vehicle's starter and/or is connected with a control of the starter and/or the motor control of the motor vehicle.

20. The device in accordance with claim 13, wherein the first and/or the second switch is are embodied as a high-side switch.

* * * * *